May 6, 1952     N. A. KAJOLA     2,595,386
LABORATORY DEVICE FOR DETERMINING MELTING POINTS
Filed Feb. 26, 1948
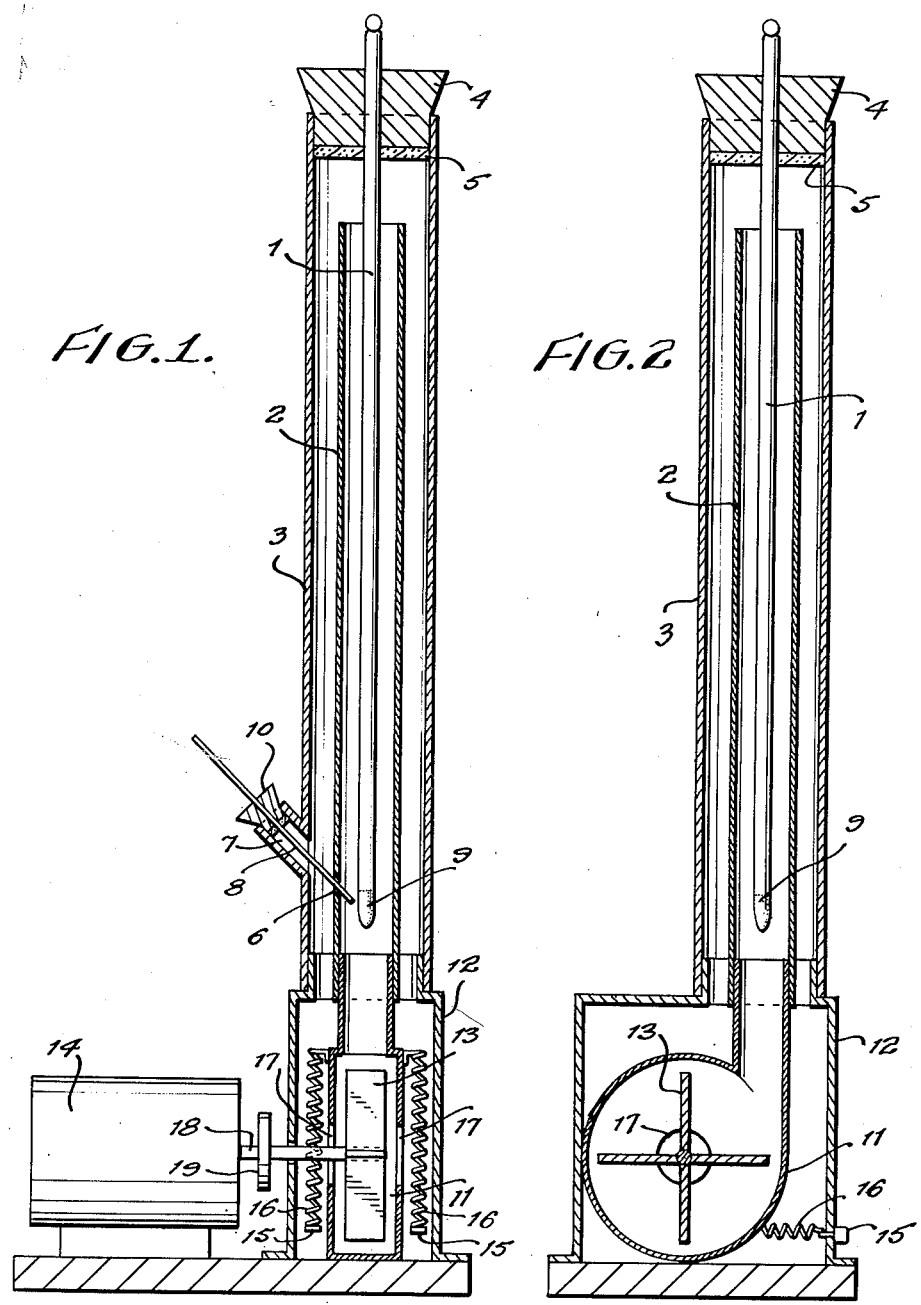
INVENTOR.
NIILO A. KAJOLA
BY Patented May 6, 1952

2,595,386

UNITED STATES PATENT OFFICE 2,595,386

LABORATORY DEVICE FOR DETERMINING MELTING POINTS

Niilo Alfred Kajola, Helsinki, Finland

Application February 26, 1948, Serial No. 11,257
In Finland March 5, 1947

4 Claims. (Cl. 73—17)

This invention relates to a laboratory device which is useful for determining melting points.

It is known that in laboratories many different kinds of devices are used for determining the melting points of for example organic substances. One of the most generally used means for determining melting points has involved the used of a capillary tube of glass into which the substance to be investigated is introduced, the thus filled capillary tube being then arranged beside the bulb of, for example, an ordinary glass thermometer which when heated together with said tube indicates the temperature at which the substance under investigation melts.

In a prior used method the capillary tube and the bulb of the thermometer are immersed into concentrated sulphuric acid or the like liquid having a high boiling point and contained in a small glass container. On heating this container over a flame the liquid, growing ever hotter, indirectly heats both the capillary tube and the bulb of the thermometer. However this method has for its greatest defect that the scale part or stem of the thermometer remains colder than the bulb part so that the thermometer indicates erroneously. At high temperatures, depending on the construction of the thermometer used, this error can be very marked for example 15 degrees at 300° C. True, this error can be amended by means of stem correction tables, but this is inconvenient and does not always give an accurate value because usually the temperature of that part of the thermometer arranged above the sulphuric acid varies with the flow of evaporating sulphuric acid fumes and air. Moreover, with a device of the kind described it is impossible to regulate temperature changes quickly. In practise, however, it is important that the temperature can be raised comparatively quickly at the beginning of the test and retarded on approaching the melting point so that both the thermometer and the melting of the substance can be observed and that uniform temperature for both the thermometer and the capillary tube can be attained despite the heat absorbed for melting the substance. This, however, cannot be performed by means of the method hereinabove described according to which heating must be slowed down long before the melting point has been reached. In the said method it is impossible to arrest abruptly the rise of temperature because it takes time for sulphuric acid to acquire uniform temperature.

The metal blocks now in general use also have the defects hereinabove described.

In another prior known device the whole thermometer or the operating part thereof as also the substance to be investigated are disposed within a loose-fitting glass tube closed at the lower end thereof and partly immersed in the sulphuric acid to be heated so that the air encircling the thermometer or the operating part thereof in said tube would keep the temperature uniform so that the bulb as well as the operating scale part of the thermometer would warm up to the same temperature. But this is a very slow away of attaining uniform distribution of heat, which cannot be accelerated by largening or reducing the flame for a layer of slowly mixable air is found between the thermometer + substance under investigation and the sulphuric acid.

It has been proposed to obviate the slowness hereinabove described inter alia by means of a device employing a glass tube arranged around the thermometer and the substance to be investigated, a current of hot air, which passes around both the thermometer and said substance, being drawn through said tube.

However the rates of flow herein employed are comparatively low for practical reasons wherefore the air is incapable of effectively compensating temperatures and the possible momentary fluctuations of the heat source also have too great an effect. Moreover, a device of the kind described is not economical because the heated air is passed only once through the device and then wasted. The abovementioned defects are also found in those devices in which heated air is blown, by means of pressure, into and out of the tube arranged around the thermometer and the substance under investigation. It has been proposed to improve the accuracy of these devices by employing a small paraffine bath into which the bulb of the thermometer and the capillary tube are arranged and which is under the influence of the abovementioned current of heated air. However, the said paraffin bath in turn renders the device slower than ever before.

The object of this invention is to obviate the defects hereinabove mentioned.

The invention will, in the following be described with reference to the accompanying drawing which illustrates an embodiment of the invention and wherein:

Figure 1 is a vertical section of the device for determining melting points as viewed from the front, and Figure 2 is a vertical section of the same as view from the side.

Two concentric tubes 2 and 3 are arranged in the manner illustrated in the drawing around the thermometer. Tube 2, which is the shorter of the two tubes, is open at the upper end thereof. On the other hand the upper end of tube 3 is closed by stopper 4, the lower part of said stopper having fixed thereto an asbestos sheet 5 for protecting stopper 4. The top of the thermometer passes through stopper 4 and sheet 5, the whole operating part of said thermometer remaining underneath said stopper and sheet. Through holes 6 and 7 provided in the tubes 2 and 3 the glass capillary tube containing the substance to be investigated can be pushed into contact with the thermometer. Stopper 10, through which said capillary tube passes, holds the said tube in place and closes hole 7. The other hole 6 is almost as large as the said capillary tube wherefore only a slight clearance remains between the two said. The lower end of tube 2 is joined to the exhaust air pipe of centrifugal blower 11, which is enclosed in casing 12 the lower end of tube 3 being joined to said casing. The blades 13 of the blower can be rotated by means of a small electric motor 14. The blower as well as the casing encircling said blower may be made of metal. In casing 12 an electrically heated coil 16 is arranged around the blower and terminates in contacts 15. The temperature of the heating coil 16 may be regulated by means of an outside rheostat, not shown in the drawing. To prevent the heat conducted along shaft 18 from overheating the motor bearings for example a cooling flange 19 made of copper may be mounted on said shaft.

The blades on being rotated by the motor draw the hot air, heated by the coil, through holes 17 into the blower and therefrom said air is forced onwards and up into tube 2, and at the upper end of the open tube downwards through the interspace formed between the two tubes 2 and 3 into casing 12 wherefrom it is recirculated gain. Consequently the same hot air is continually circulated and flows past both thermometer and substance under investigation.

The speed of the air current should be kept relatively high, approximately 15 m./sec. or more. If the circulation course of the air current is for example 50 cm. long, the air is forced 30 times or more in a second through the device, wherefore heat is transferred very rapidly indeed from the heating coils to the capillary tube containing the substance under study as also to the whole operating part of the thermometer. Perfectly even temperature in the circulating air is also attained thereby that the air after it has been heated is first forced through the blower, which mixes it thoroughly and only after this has been done forces the mixed air into contact with the thermometer and the substance under study. Thus, the operative part of the thermometer and the capillary tube are entirely enveloped in a medium of uniform temperature wherefore the values obtained are always accurate. On changing the temperature of the heating coil the corresponding change is also rapidly transferred to the thermometer and the capillary tube by reason of the rapidly circulating current of air. Moreover, the device described is very economical for the whole time the same air is kept circulating therein. Heat losses due to conduction of heat can also be reduced to a minimum for example by covering the casing 12 totally and the tube 3 partly with some heat insulating material. The hole, provided in the wall of the casing 12 and arranged for the shaft 18 to rotate in, must fit as well as possible to the said shaft so as to prevent outside air from taking part in the determination test. No bearings are arranged in the said hole because the wall of the casing gets warm and the shaft rotates only as supported by the bearings of the motor.

The device illustrated in the accompanying drawing and hereinabove described is only an embodiment of the invention and it is obvious that many changes in the details and materials as well as in the construction of this device may be made within the scope and spirit of this invention. Thus two or more capillary tubes may be simultaneously arranged into the device and the capillary tube or tubes may be attached to the thermometer. In addition to electricity a flame or the like arranged underneath the device may be employed as heating source.

Having thus described my invention, what is claimed as new is:

1. A laboratory device for testing or determining melting points of various materials with the use of a thermometer in suspended position, said device including a transparent tube open at both ends and surrounding substantially the entire effective length of the thermometer; an air propulsion device having an outlet port connected to the lower end of the tube and having at least one intake port independent of said tube; means for removably supporting a sample of material to be tested adjacent to the lower end of the thermometer; means for pendently supporting said thermometer in said tube but out of contact therewith; means for confining and guiding the air issuing from the upper end of said tube to a downward path about the latter leading to said intake port upon the air propulsion device; means for heating the air approaching the intake port of said air propulsion device; and means for driving the latter device.

2. A laboratory device for testing or determining melting points of various materials with the use of a thermometer in suspended position, said device including a first inner transparent tube open at both ends and surrounding substantially the entire effective length of the thermometer; an air propulsion device having an outlet port connected to the lower end of the tube and having at least one intake port independent of said tube; a casing enclosing the air propulsion device and having a chamber exteriorly of the intake port of said air propulsion device and with an opening in the casing directed upwardly in the direction of said first tube; a second relatively larger transparent outer tube surrounding the first inner tube in spaced relation thereto with the lower end of said second tube connected to the upper opening of said casing and at the upper end extending beyond the upper end of said first tube; heating means disposed in said chamber for heating the air descending from between the two tubes into said chamber and approaching said input port in said air propulsion device; a closure for the upper end of said second tube having means for suspending said thermometer by the upper end thereof, both tubes having side openings individually located above the lower ends of said tubes through which a sample of material to be tested may be inserted into proximity of the lower end of said thermometer; means for closing the side opening in the second outer tube and simultaneously supporting the sample of said material removably in position adjacent to said thermometer; and means for driving said air propulsion device.

3. A laboratory device for testing or determining melting points of various materials with the use of a thermometer in suspended position, said device including a transparent first inner tube open at both ends and surrounding substantially the entire effective length of the thermometer with the upper end of the latter extending above the upper end of said first tube; an air propulsion device provided with an inner casing having at least one intake opening and an air outlet pipe connected directly to the lower end of said tube independently of the intake opening; an outer casing surrounding the air propulsion device having a chamber therein with an upwardly directed opening, said chamber communicating directly with the intake opening in the inner casing; a second transparent outer tube surrounding the first inner tube and connected at the lower end directly to the upwardly directed opening of said outer casing and at the upper end extending a distance beyond the upper end of said first inner tube; a closure member fitting the upper end of said second outer tube and having a portion in which the upper end of said thermometer is frictionally held in order to suspend said thermometer in said first tube; electrical heating means in aforesaid chamber for heating the air passing down into the outer casing from between the two tubes to the chamber in the latter casing and approaching said intake opening for recirculation upwardly through said first inner tube about said thermometer, both outer and inner tubes having individual registering side openings located above the lower ends thereof and leading to the lower portion of the thermometer through which a sample of material to be tested may be inserted into proximity of the lower end of said thermometer; means for closing the side opening in the second outer tube and simultaneously supporting the sample of said material removably in position adjacent to said thermometer; and means for driving said air propulsion device.

4. A laboratory device for testing or determining melting points of various materials with the use of a thermometer in suspended position, said device including an air blower having intake openings at the sides thereof and an independent upwardly directed air outlet pipe; a casing enclosing said air blower and containing a chamber in open communication with both intake openings in said blower, said casing having an upwardly directed opening about the air outlet pipe; an upwardly directed transparent inner tube open at both ends having the lower end directly connected to said air outlet pipe, said inner tube surrounding substantially the entire effective length of the thermometer; an outer relatively larger transparent tube directly connected to the upwardly directed opening of the casing and extending upwardly therefrom about the inner tube in spaced relation with the latter and beyond the upper end thereof; a removable stopper fitted into the upper end of the outer tube and having an axial hole through which the upper end of the thermometer extends and in which it is frictionally held; an inclined hollow port member extending from the side of the outer tube a short distance above the lower end thereof; the inner tube having a relatively smaller opening in the side above the lower end thereof axially registering with the inclined port member; a stopper for the outer end of said port member adapted to support a sample of material to be tested while extending into proximity of the lower end of the thermometer through the relatively smaller opening in said inner tube; a prime mover for driving said air blower; and an electric heating coil located in the chamber of said casing for heating the air entering the casing downwardly from between the two tubes and approaching the two intake openings in said blower.

NIILO ALFRED KAJOLA.

REFERENCES CITED

The following references are of record in the file of this patent:

UNITED STATES PATENTS

| Number | Name | Date |
| --- | --- | --- |
| 2,079,344 | Geyer | May 4, 1937 |
| 2,299,867 | Wolfson | Oct. 27, 1942 |